US012789119B2

(12) United States Patent
Knowles

(10) Patent No.: US 12,789,119 B2
(45) Date of Patent: Nov. 10, 2026

(54) INTEGRATED MOLDED ANGLED RESTING SECTION FOR A LAUNDER CHANNEL COVER PANEL

(71) Applicant: NAF WATER FILTRATION LLC, Denmark, SC (US)

(72) Inventor: Thaddeus J. Knowles, Stuart, FL (US)

(73) Assignee: NAF WATER FILTRATION LLC, Denmark, SC (US)

( * ) Notice: Subject to any disclaimer, the term of this patent is extended or adjusted under 35 U.S.C. 154(b) by 720 days.

(21) Appl. No.: 18/202,282

(22) Filed: May 25, 2023

(65) Prior Publication Data

US 2024/0390821 A1 Nov. 28, 2024

(51) Int. Cl.
*B01D 21/00* (2006.01)
*B01D 21/24* (2006.01)

(52) U.S. Cl.
CPC ..... *B01D 21/0003* (2013.01); *B01D 21/0006* (2013.01); *B01D 21/2444* (2013.01)

(58) Field of Classification Search
None
See application file for complete search history.

(56) References Cited

U.S. PATENT DOCUMENTS 3,891,557 A * 6/1975 Edgerton ............. B01D 21/245 210/519
4,767,536 A * 8/1988 Roley .................... B01D 21/10 210/608
5,670,045 A * 9/1997 Schaller ............. B01D 21/2433 210/528
5,965,023 A * 10/1999 Schaller ............. B01D 21/2433 210/528
6,216,881 B1 * 4/2001 Schaller ............. B01D 21/2444 210/528
6,712,222 B2 * 3/2004 Schaller ............. B01D 21/2405 210/528
7,473,358 B1 * 1/2009 Schaller ............. B01D 21/2444 210/232
7,591,381 B2 * 9/2009 Schaller ............. B01D 21/0006 210/519
7,722,776 B2 * 5/2010 Essemiani .......... B01D 21/0087 210/801
9,174,148 B2 * 11/2015 Schaller ............. B01D 21/2444
9,873,068 B2 * 1/2018 Schaller ............. B01D 21/0006
10,722,823 B2 * 7/2020 Knowles ............ B01D 21/0042
11,052,329 B1 * 7/2021 Janssen .............. B01D 21/0003
11,179,656 B2 * 11/2021 Knowles ................ B01D 21/02
11,331,601 B2 * 5/2022 Beaman ................ B01D 21/186
11,465,075 B2 * 10/2022 Morgan ............. B01D 21/2444
11,511,215 B2 * 11/2022 Janssen .............. B01D 21/0003
(Continued)

*Primary Examiner* — Bradley R Spies
*Assistant Examiner* — Jeannie Mcdermott
(74) *Attorney, Agent, or Firm* — Sofer & Haroun, LLP

(57) ABSTRACT

A system is provided for covering a launder channel of a clarifier tank, the launder channel having a tank wall and launder channel wall. The system includes a mounting section connected to either one of the tank wall or the launder channel wall, a hinge, and an openable cover panel coupled to the mounting section by the hinge, movable between a closed and open position. The openable cover panel has an integrated molded angled resting section, such that when said openable cover panel is in the open position, the integrated molded angled resting section rests against the mounting section.

8 Claims, 8 Drawing Sheets

(56) References Cited

U.S. PATENT DOCUMENTS

| | | | | |
|---|---|---|---|---|
| 11,617,972 | B2 * | 4/2023 | Schmit | B01D 21/0042 210/538 |
| 11,717,773 | B2 * | 8/2023 | Janssen | B01D 21/0003 210/541 |
| 12,508,523 | B2 * | 12/2025 | Janssen | B01D 21/0003 |
| 2004/0016696 | A1 * | 1/2004 | Schaller | B01D 21/0042 210/540 |
| 2009/0001015 | A1 * | 1/2009 | Schaller | B01D 21/2444 210/528 |
| 2009/0032476 | A1 * | 2/2009 | Schaller | B01D 21/2416 210/519 |
| 2016/0236116 | A1 * | 8/2016 | Schaller | B01D 21/0006 |
| 2018/0036654 | A1 * | 2/2018 | Schaller | B01D 21/2444 |
| 2020/0047087 | A1 * | 2/2020 | Knowles | B01D 21/2444 |
| 2021/0046404 | A1 * | 2/2021 | Morgan | F16B 5/0008 |
| 2021/0245076 | A1 * | 8/2021 | Knowles | B01D 21/0003 |
| 2021/0387111 | A1 * | 12/2021 | Janssen | B01D 21/0003 |
| 2021/0402330 | A1 * | 12/2021 | Schmit | B01D 21/2433 |
| 2023/0080976 | A1 * | 3/2023 | Janssen | B01D 21/0003 210/541 |
| 2023/0372842 | A1 * | 11/2023 | Janssen | B01D 21/0003 |
| 2024/0390821 | A1 * | 11/2024 | Knowles | B03D 1/1462 |

* cited by examiner

INTEGRATED MOLDED ANGLED RESTING SECTION FOR A LAUNDER CHANNEL COVER PANEL

FIELD OF THE INVENTION

The present arrangement relates to launder covers. More particularly, the present arrangement relates to an integrated latch/hold-open system for launder channel covers.

DESCRIPTION OF RELATED ART

In the prior art, launder channel covers are typically designed with a restraint cable as shown in prior art FIG. 1. This restraint cable is used to keep the cover panel from over rotating outward and/or obstructing a sweep arm mechanism that cleans the weir/scum baffle.

In another prior art arrangement shown in FIG. 2 a prop-rod may be used to hold the cover panel in an open position for cleaning, while keeping it from over rotating in either direction to prevent damage to the sweep arm mechanism or to the support flange on the tank wall.

However, the restraint cable of FIG. 1 does not have the ability to prevent the cover from quickly closing down on the support flange on the tank wall. If the cover panel closes to fast, it slams on the support flange and can break the flange or the panel.

The prop-rod from prior art FIG. 2 creates an obstruction for someone walking through the launder channel. Also, such designs are prone to accidental disengagement causing quick over rotation in either direction which can likewise damage the cover panel.

Another prior art arrangement described in U.S. Pat. No. 11,179,656 provides an integrated latch system/hold open arrangement to hold the panel cover in an open position allowing an unobstructed pathway in the launder channel and access for cleaning of the weir and/or launder channel. In this arrangement an integrated latch system/hold open arrangement is located on a resting structure on the mounting section of the cover panel located at the weir/launder channel wall and has an associated locking post/locking pin to hold the panel cover in an open position allowing access and cleaning of the launder channel. See for example prior art FIGS. 3 and 4.

As shown in FIG. 3, the mounting section located on the weir/launder channel wall includes an angled resting structure for supporting the cover panel, when in the open position, away from the mounting section. The prior art arrangement may also include a locking post, shown in FIG. 4, configured to be passed through a receiving hole to support said cover panel in said open position when the cover panel is opened and resting against the resting structure on the mounting section.

There are potential issues with these prior art arrangements. For example, one issue can arise when the mounting section and resting structure for the cover panel, located on the launder channel/weir wall (on the tank wall). In this arrangement, it can be difficult to access by cleaning personal that have limited access to the launder channel space. For example, in some instances, the cleaning personal may have limited access to reach the weir/launder channel wall so it might be difficult for them to reach the locking/unlocking pin to release the cover panel from the resting structure to close the cover.

Additionally, for clarifiers that have the launder channel deep within the clarifier tank, down from the top of the side wall of the tank, the covers mounting section is attached to the outer tank/launder channel wall and not at the weir wall. If the prior art integral resting structure is on the mounting section it becomes too close to the wall and the cover panel will not rotate enough to engage with the resting feature. To alleviate this issue with the prior art arrangement, the mounting section horizontal length would have to be increased to allow for the cover panel to rotate more and have more room for the resting structure as shown in prior art FIGS. 5 and 6. This can create more obstruction in the launder channel which contradicts the main idea of decreasing obstruction for plant personnel. The angle and height of the resting feature would have to be increased to meet the cover panel as well. This creates a fabrication and structural issue along with possibly interfering with the attaching hardware.

Also, another issue with the prior art design is that the resting structure is a feature of the mounting section, which itself is a complex molded object, with angles, hinges, and bracket/attachments features need to mount the cover panels to the tank. As a result, when molding and fabricating the mounting section to include a resting structure it is sometimes difficult to modify the shape of the mounting section to properly accommodate such a resting structure without interfering with the other elements of the mounting section and without significant effort to change the molding.

OBJECTS AND SUMMARY

The present arrangement overcomes the drawbacks associated with the prior art and provides for a mounting section and restring structure for connection to the outside tank wall, providing for an easier and reduced costs construction. In the prior art the restring structure is a molded portion of the mounting section. In the present arrangement, the resting structure is instead a molded portion of the cover panel near the area it contacts the mounting section. In this way, only the cover panel needs to have the molding adjusted to accommodate the resting structure and the more complex mounting section can remain flat. Such an arrangement allows for the mounting section and resting structure (on the panel) to placed equally on either the weir wall of the outer tank wall without the need to have an over extended mounting section, particularly in the case when it is mounted to the outer tank wall.

To this end a system is provided for covering a launder channel of a clarifier tank, the launder channel having a tank wall and launder channel wall. The system includes a mounting section connected to either one of the tank wall or the launder channel wall, a hinge, and an openable cover panel coupled to the mounting section by the hinge, movable between a closed and open position. The openable cover panel has an integrated molded angled resting section, such that when said openable cover panel is in the open position, the integrated molded angled resting section rests against the mounting section.

BRIEF DESCRIPTION OF THE FIGURES

The invention will be described in more detail with reference to the accompanying drawings, wherein.

DETAILED DESCRIPTION

Figure 1:
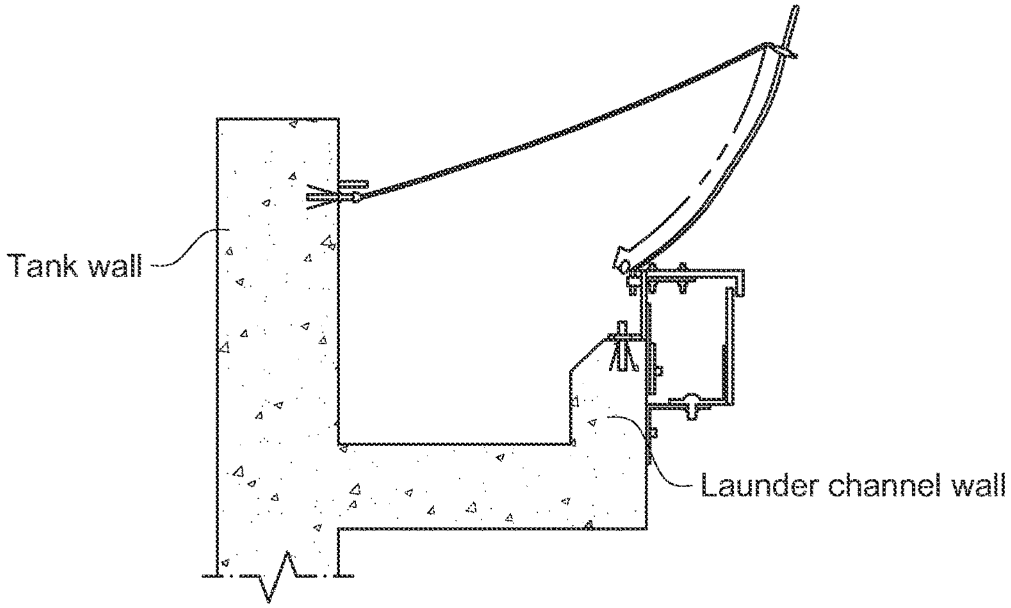
FIG. 1 (PRIOR ART)
FIG. 1 is a prior art image of a launder channel cover with a restraint cable.
Figure 2:
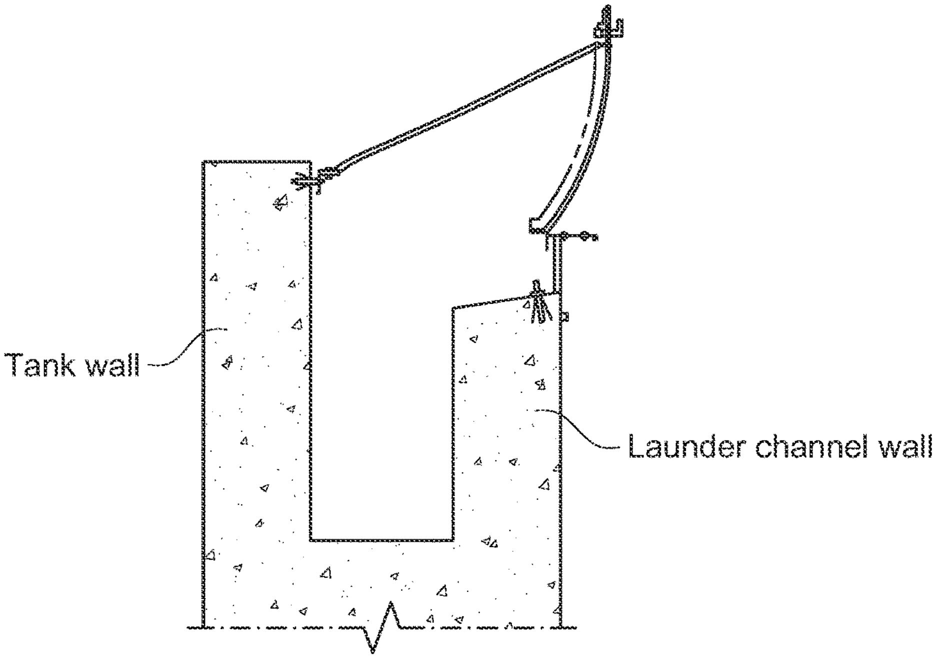
FIG. 2 (PRIOR ART)
FIG. 2 is a prior art images of a launder channel cover with prop-rod.
Figure 3:
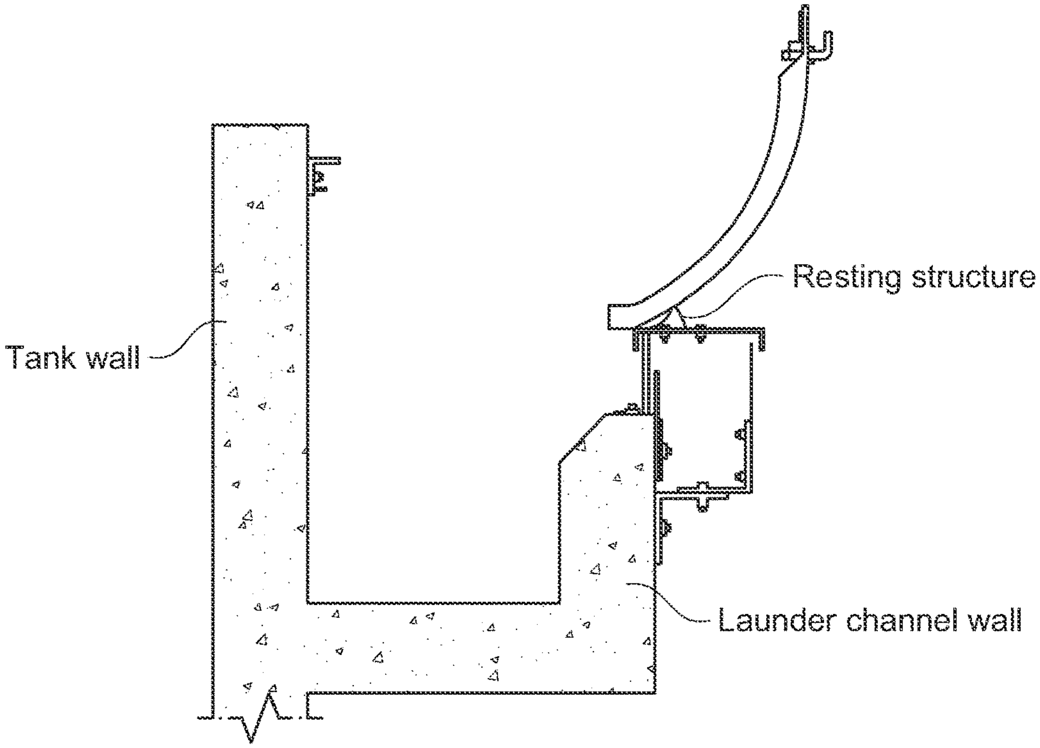
FIG. 3 (PRIOR ART)
FIG. 3 is a prior art arrangement of a launder channel cover with a mounting section and integrated resting structure attached to a weir wall.
Figure 4:
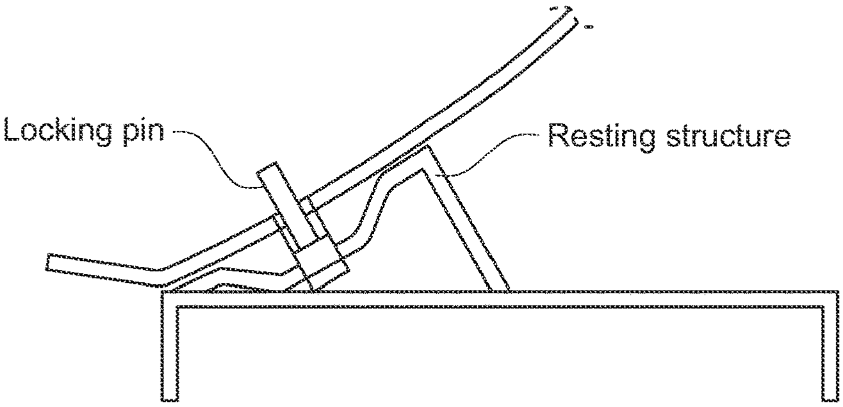
FIG. 4 (PRIOR ART)
FIG. 4 is a prior art arrangement of a launder channel cover with a mounting section and integrated resting structure showing a locking pin.
Figure 5:
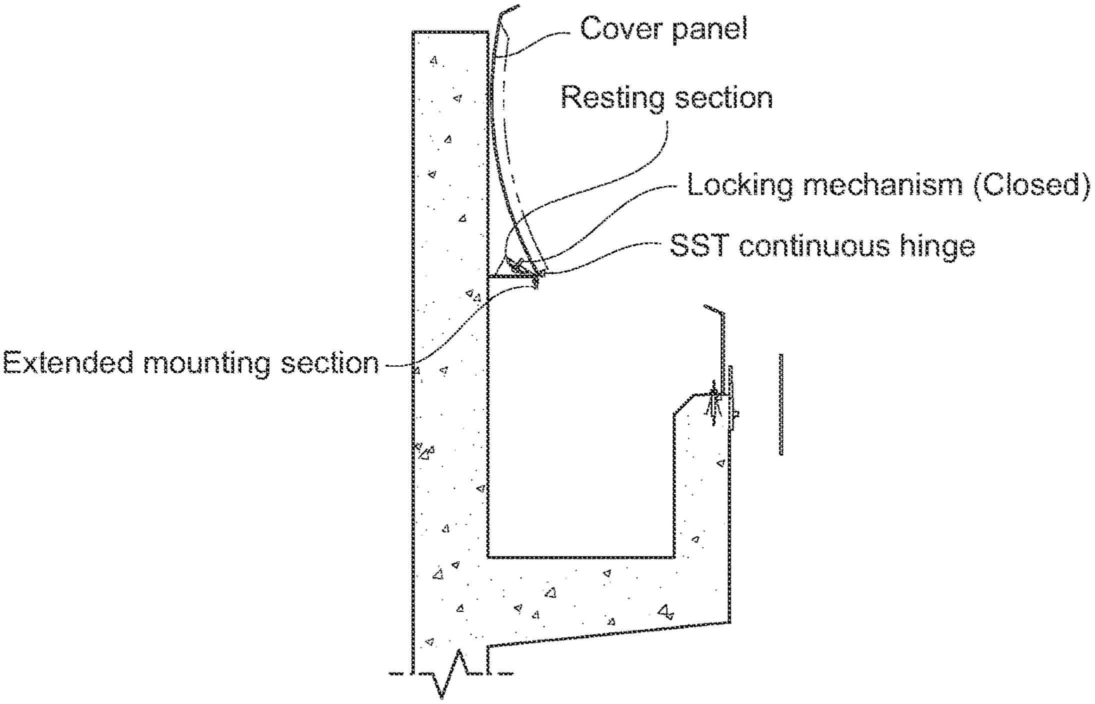
FIG. 5 (PRIOR ART)
FIG. 5 is a prior art arrangement of a launder channel cover with a mounting section and integrated resting structure attached to an outer tank wall, in the open position.
Figure 6:
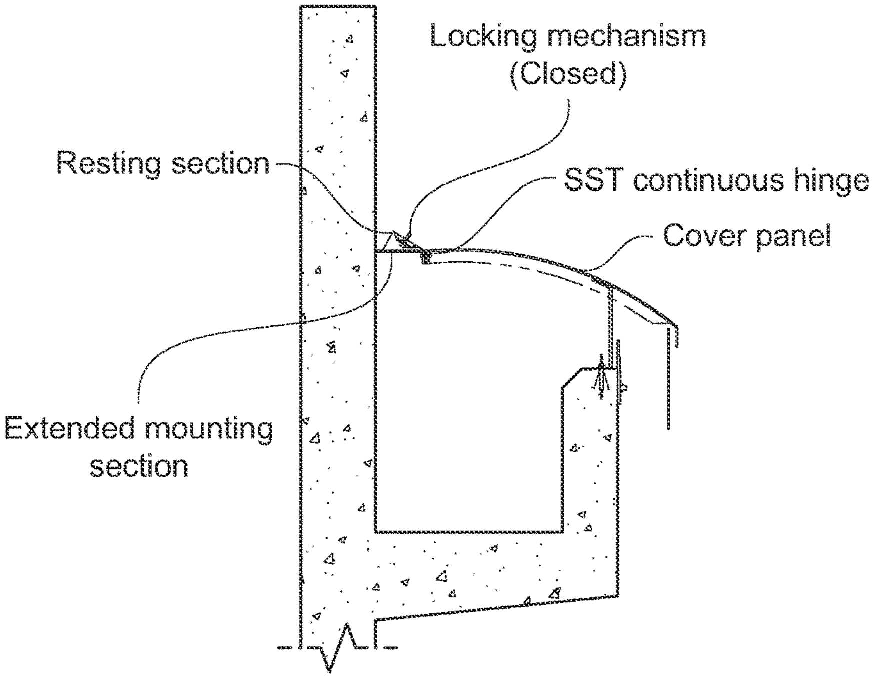
FIG. 6 (PRIOR ART)
FIG. 6 is a prior art arrangement of a launder channel cover with a mounting section and integrated resting structure attached to an outer tank wall, in the closed position.
Figure 7:
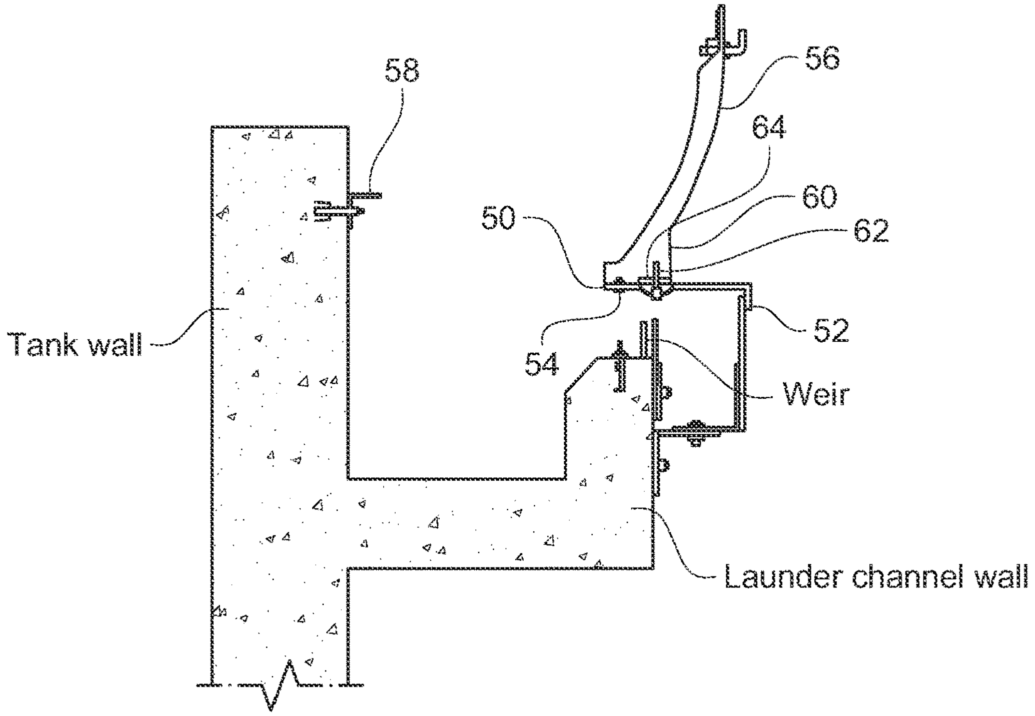
FIG. 7 is an arrangement of a launder channel cover with an integrated molded angled resting section and a mounting section attached to a weir wall, in the open position, in accordance with one embodiment.
Figure 8:
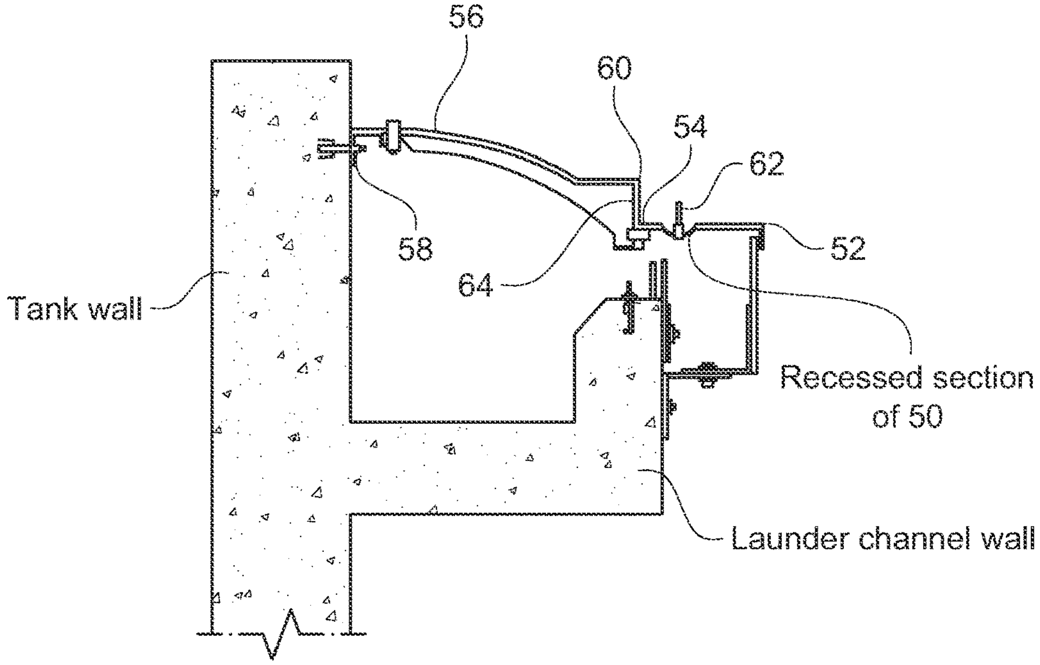
FIG. 8 is an arrangement of a launder channel cover with the integrated molded angled resting section and a mounting section attached to a weir wall, in the closed position, in accordance with one embodiment.

In one embodiment, shown in FIGS. 7 and 8 illustrate a cutaway view of a launder channel formed from a tank wall, a channel wall and an attached weir. This launder channel is disposed around the periphery of a sewage treatment launder tank. In FIGS. 7 and 8, attached to the channel wall is a scum baffle as well as a weir, and it is understood that additional launder channel equipment could be implemented as well.

As shown in FIGS. 7 and 8, attached to the top of the channel/weir wall, a panel mounting section 50 is provided. Panel mounting section 50 may be supported by attachment to an integrated support bracket 52 on the channel wall that may also support for example the scum baffle.

Mounting section 50, attached to support bracket 52 at the channel/weir wall, maintains a hinge 54 that connects with an openable cover panel 56. Typically, as shown in FIGS. 7 and 8 and other Figures herein, cover panel 56 is a curved structure forming a domed cover over the launder channel. Cover panel 56 spans from the weir/channel wall, across the launder channel, and rests on tank wall at bracket 58 such as an L-bracket that connects to an inside of the tank wall to support cover panel 56 when closed. As shown in FIG. 8, when cover panel 56 is closed and resting on tank wall bracket 58, it covers the entire launder channel as well as the weir and scum baffle (when panel 56 and mounting section 50 are taken in combination).

As shown in FIGS. 7 and 8 cover panel 56 has a integrated molded angled resting section 60 so that when open, cover panel 56 is not able to over-rotate when opening. For example, when cover panel 56 is opened, as shown in FIG. 7, integrated molded angled resting section 60, located near hinge 54, presents a flat angled surface that lays flat against the flat upper surface of mounting section 50. Unlike the prior art, integrated molded angled resting section 60 is fabricated directly/integrated as part of cover panel 56 so mounting section 50 can retain its typical flat shape. In one embodiment, integrated molded angled resting section 60 of curved cover panel 56 is formed by an approximately 30° angled deflection (the "angled" part) from the main curved surface, and then sharply cutting down in a flat arrangement (the "resting" part) so that when integrated molded angled resting section 60, located near hinge 54 lays flat against the flat upper surface of mounting section 50, cover panel 56 is essentially held at about 90° upward from, perpendicular to mounting section 50 as shown in FIG. 7.

As shown in FIGS. 7 and 8, as with the first embodiment, mounting section 50 may have a locking pin 62, possibly projecting from a slightly recessed portion of mounting section 50, configured to pass through an opening 64 in integrated molded angled resting section 60 of cover panel 56 to hold panel 56 in an open position during cleaning operations and to prevent panel 56 from slamming shut, for example when it is windy during the cleaning operations.

Figure 9:
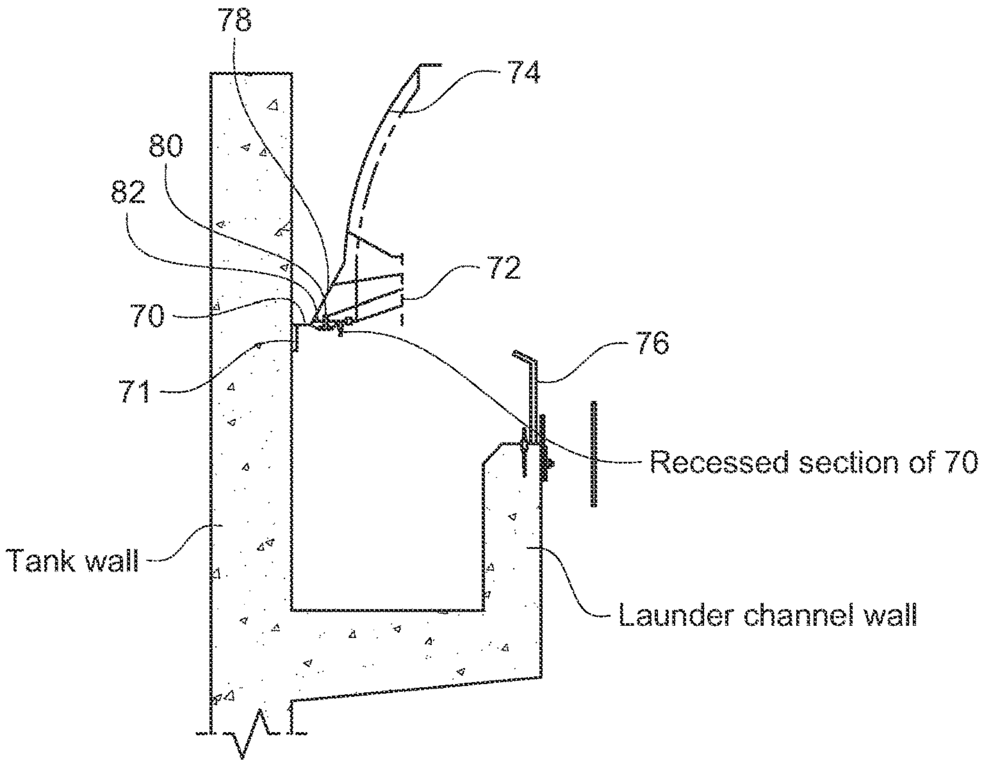
FIG. 9 is an arrangement of a launder channel cover with the integrated molded angled resting section and a mounting section attached to a tank wall, in the open position, in accordance with one embodiment.
Figure 10:
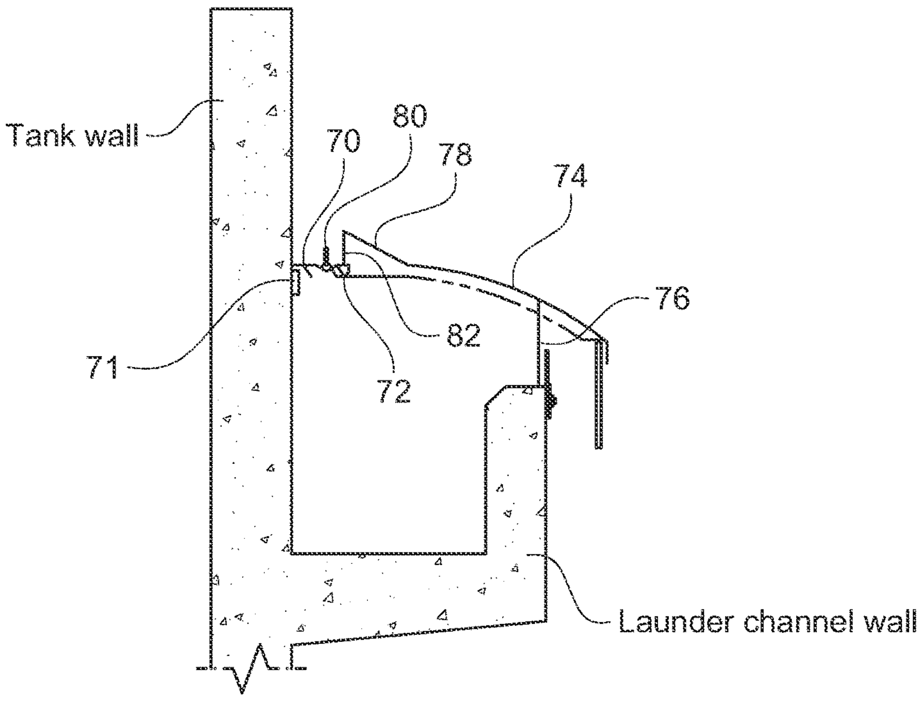
FIG. 10 is an arrangement of a launder channel cover with the integrated molded angled resting section and a mounting section attached to a tank wall, in the closed position, in accordance with one embodiment.

In another embodiment FIGS. 9 and 10 illustrate a cutaway view of a launder channel formed from a tank wall, a channel wall and an attached weir. This launder channel is disposed around the upper periphery of a sewage treatment launder tank. In FIGS. 9 and 10, attached to the channel wall is a scum baffle as well as a weir, and it is understood that additional launder channel equipment could be implemented as well.

Attached to the top of the outer tank wall, a panel mounting section 70 is provided. Panel mounting section 70 may be supported by attachment to a support flange 71 on the tank wall or may be alternatively supported by other means connection means thereto (not shown).

Mounting section 70, attached to the tank wall, maintains a hinge 72 that connects with an openable cover panel 74. Cover panel 74 spans across the launder channel and rests on support structure 76 such as a vertical bracket that connects to and projects from the top of launder channel/weir wall to support cover panel 74 when closed. As shown in FIG. 10, when cover panel 74 is closed and resting on support structure 76, it covers the entire launder channel as well as the weir and scum baffle (via the overhang past support structure 76).

As shown in FIGS. 9 and 10 cover panel 74 has an integrated molded angled resting section 78 so that when open, cover panel 74 is not able to over-rotate when opening. For example, when cover panel 74 is opened, as shown in FIG. 9, integrated molded angled resting section 78, located near hinge 72, presents a flat angled surface that lays flat against the flat upper surface of mounting section 70. In one embodiment, integrated molded angled resting section 78 has similar design and angles to integrated molded angled resting section 60 described above.

As shown in FIGS. 9 and 10, as with the first and second embodiments, mounting section 70 may have a locking pin 80 configured to pass through an opening 82 in integrated molded angled resting section 78 of cover panel 74 to hold panel 74 in an open position during cleaning operations and to prevent panel 74 from slamming shut, for example when it is windy during the cleaning operations.

Unlike the prior art molded angle section 78 is fabricated directly as part of cover panel 74 so mounting section 70 can retain its typical flat shape. Additionally, because integrated molded angled resting section 78 is part of cover panel 74 and not part of mounting section 70 as in the prior art, when mounting section 70 is attached to the outer tank wall, mounting section does not need to be overly extended into the tank so it does not obscure much of the launder channel, allowing for easier access for cleaning.

Figure 11:
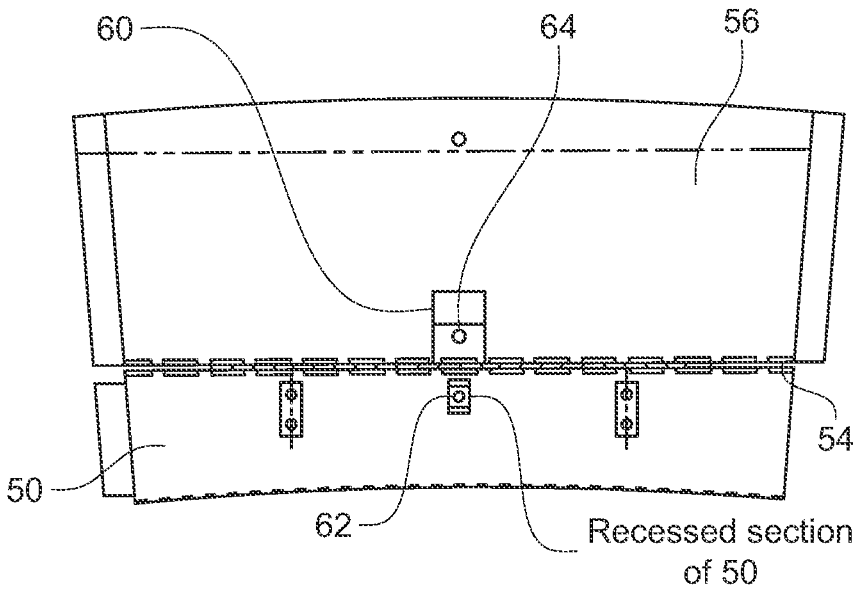
FIG. 11 is a top view of the mounting section and cover with the integrated molded angled resting section of FIG. 8, in accordance with one embodiment.
Figure 12:
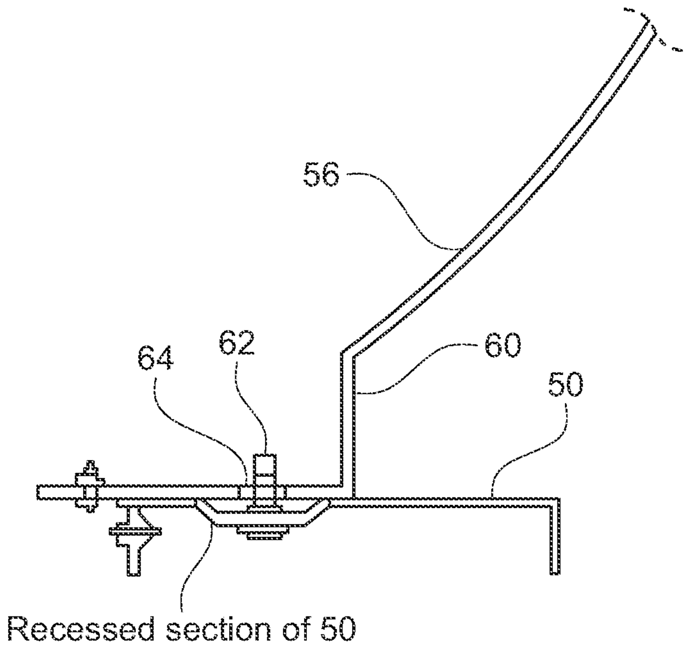
FIG. 12 is a side close-up view of the mounting section and cover with the integrated molded angled resting section of FIG. 7, in accordance with one embodiment.

FIGS. 11 and 12 show close-up view of panel 56 from FIGS. 7 and 8 to better illustrate opening 64 in integrated molded angled resting section 60 of cover panel 56, as well as mounting section 50, and pin 62, in both the closed position (FIG. 11—top view) and open position (FIG. 12—side view).

Figure 13:
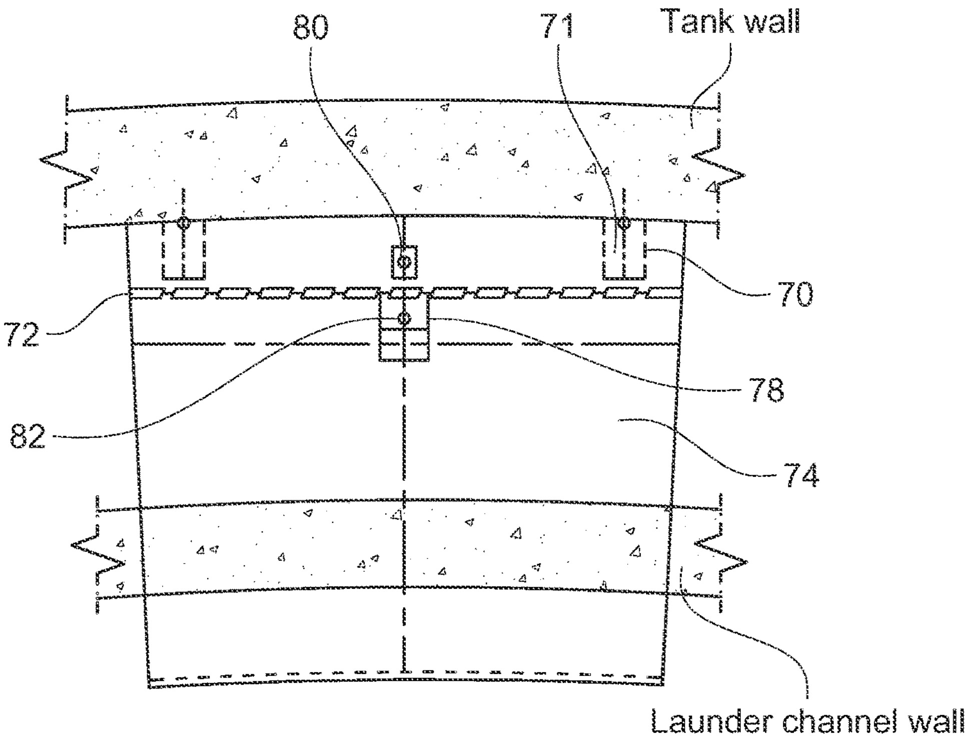
FIG. 13 is a top view of the mounting section and cover with the integrated molded angled resting section of FIG. 10, in accordance with one embodiment.
Figure 14:
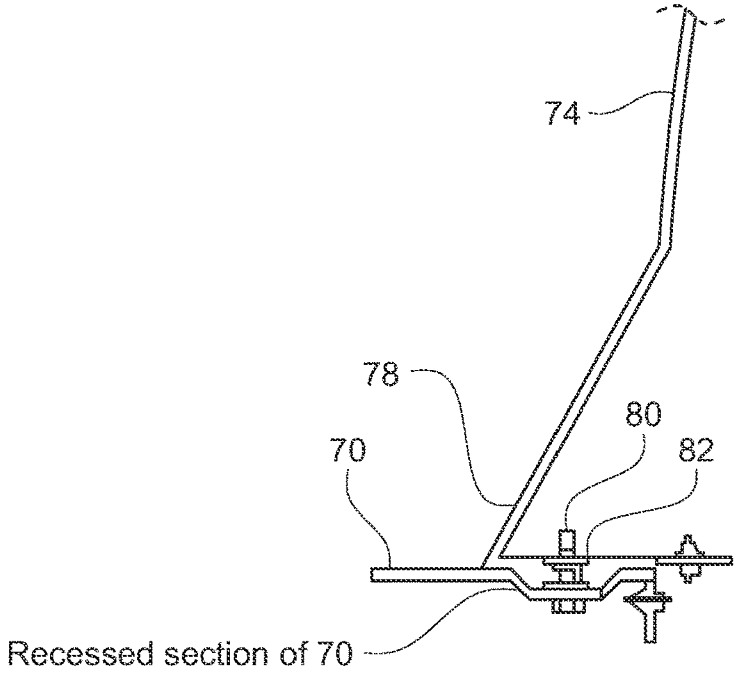
FIG. 14 is a side close-up view of the mounting section and cover with the integrated molded angled resting section of FIG. 9, in accordance with one embodiment.

FIGS. 13 and 14 show close-up view of panel 74 from FIGS. 9 and 10 to better illustrate opening 82 in integrated molded angled resting section 78 of cover panel 74, as well as mounting section 70, and pin 80, in both the closed position (FIG. 13—top view) and open position (FIG. 14—side view).

Figure 15C:
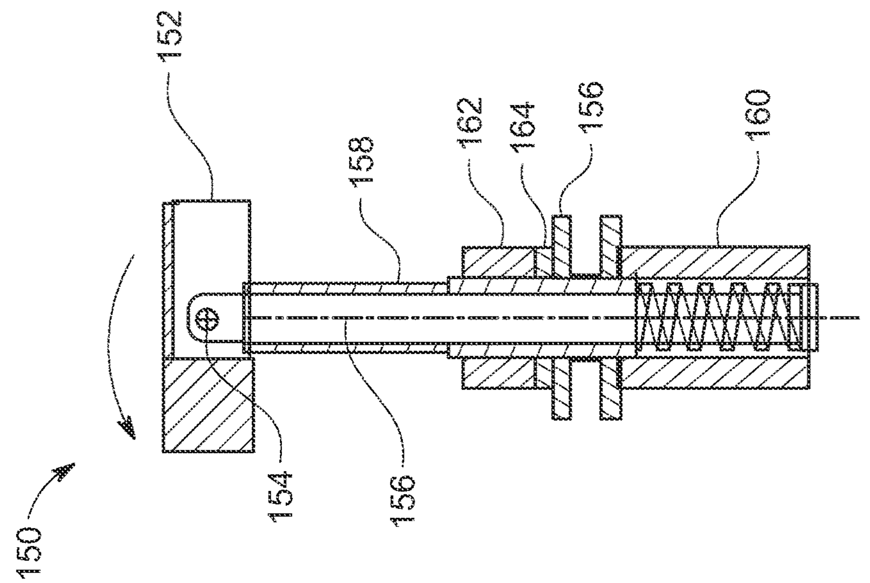
FIGS. 15A-15C are close up view of a spring-loaded locking pin in accordance with one embodiment.
Figure 15B:
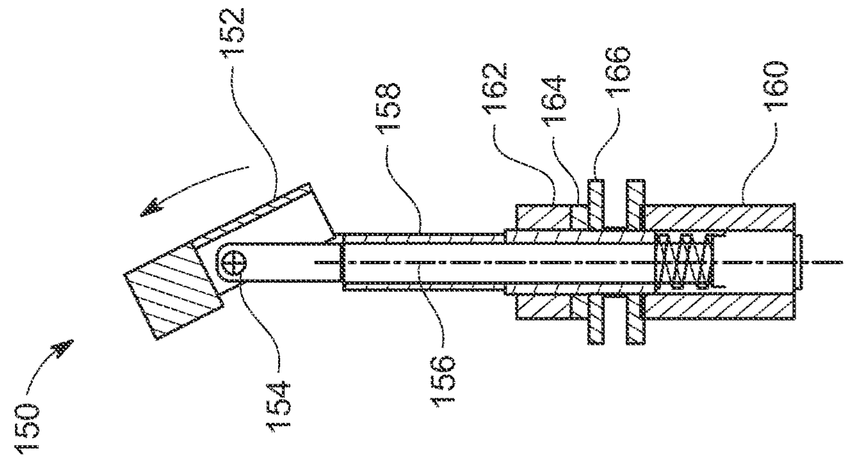
Figure 15A:
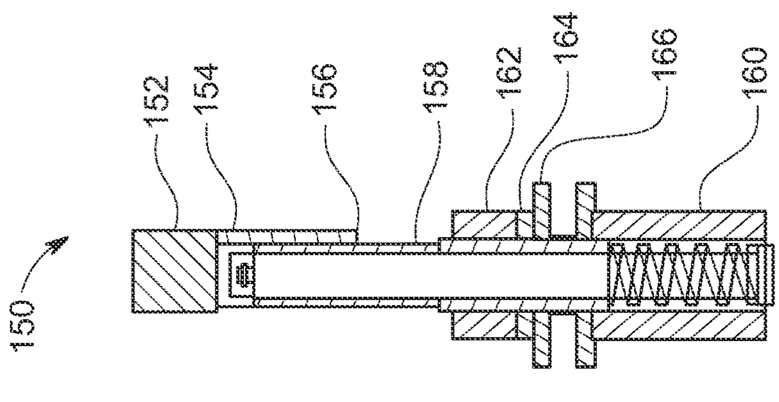

In another embodiment, each of pins 62/80 from FIGS. 7-10 may be fashioned as a spring-loaded locking post that allows for securing panels 56/74 in the open position as explained in more detail below. Using pin 62 and panel 56 as an example (for both embodiments from FIGS. 7-10), FIGS. 15A-15C illustrate pin 62 may be implemented as spring-loaded locking post 150. Such locking post 150 may be used in place of pins 62/80 on mounting section 50/70 discussed above.

In this arrangement, locking post 150 has a handle 152, a pin 154, a shaft 156, a barrel 158, a spring 160, a nut 162, a washer 164, and a locking nut 166. Handle 152 is connected in a pivotable manner to shaft 156 via pin 154. The far end of shaft 156 is connected to spring 160. This allows handle 152 to be spring loaded to be pulled away from barrel 158 (on which it initially rests against), and also rotatable about pin 154 (as shown in FIGS. 15B and 15C).

In a closed un-locked position, handle 152 is in line with shaft 156 and barrel 158. As shown in FIG. 15B handle 152 is pulled up by the user, against the force of spring 160 and connected shaft 156 so that handle 152 is free to rotate on pin 154 to be perpendicular to barrel 158. Finally, as shown in FIG. 15C, handle 152 is set perpendicular to the top of barrel 158 and is pulled down in a locked position by the retraction of spring 160 and shaft 156. The remaining components of nut 162, washer 164, and locking nut 166 are used to connect locking post 150 to angled resting structure mounting section 50/70 (so that it is a removable feature).

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for covering a launder channel of a clarifier tank, the launder channel having a tank wall and launder channel wall, said system comprising:

a mounting section with a flat shape, connected to either one of said tank wall or said launder channel wall;

a hinge; and an openable cover panel separate from and coupled to said mounting section by said hinge, movable between a closed position and an open position, wherein said openable cover panel has an integrated molded angled resting section, such that when said openable cover panel is in the open position, said integrated molded angled resting section rests against said mounting section, wherein said integrated molded angled resting section is fabricated directly as part of said openable cover panel such that said integrated molded angled resting section can rest directly on said mounting section with a flat shape.

2. The system as claimed in claim 1, wherein said mounting section includes a locking post configured to be passed through a receiving hole in said integrated molded angled resting section of said cover panel to support said cover panel in said open position.

3. The system as claimed in claim 2, wherein said locking post has a transverse locking pin.

4. The system as claimed in claim 3, wherein said locking post is spring loaded.

5. The system as claimed in claim 4, wherein said locking post, has a rotatable handle connected by a pin to a shaft and, in turn to a spring, said shaft passing through a barrel, such that said handle can be either in a linear arrangement with said barrel in an open position, and where said handle can be rotated perpendicular to said barrel in a locked position.

6. The system as claimed in claim 1, wherein said integrated molded angled resting section is disposed at an angle away from a curved surface of said cover panel.

7. The system as claimed in claim 6, wherein said integrated molded angled resting section is angled at approximately 30 degrees from said curved surface of said cover panel.

8. The system as claimed in claim 6, wherein said integrated molded angled resting section is angled to support said cover panel such that it supports said cover panel, at a point when said cover panel is unfolded around said hinge to rest on said mounting section, to approximately 90°.

* * * * *